(12) United States Patent
Deister et al.

(10) Patent No.: US 11,268,642 B2
(45) Date of Patent: Mar. 8, 2022

(54) COUPLING DEVICE FOR RELEASABLY CONNECTING CONDUIT PORTIONS

(71) Applicant: EISELE GmbH, Waiblingen (DE)

(72) Inventors: Viktor Deister, Backnang (DE); Victor Cojocaru, Stuttgart (DE)

(73) Assignee: EISELE GmbH, Waiblingen (DE)

( * ) Notice: Subject to any disclaimer, the term of this patent is extended or adjusted under 35 U.S.C. 154(b) by 546 days.

(21) Appl. No.: 16/097,650

(22) PCT Filed: Mar. 29, 2017

(86) PCT No.: PCT/EP2017/000385
§ 371 (c)(1),
(2) Date: Oct. 30, 2018

(87) PCT Pub. No.: WO2017/190825
PCT Pub. Date: Nov. 9, 2017

(65) Prior Publication Data
US 2019/0137023 A1    May 9, 2019

(30) Foreign Application Priority Data

May 2, 2016    (DE) ..................... 10 2016 005 300.3

(51) Int. Cl.
*F16L 37/12*    (2006.01)
*F16L 37/56*    (2006.01)
*F16L 3/015*    (2006.01)

(52) U.S. Cl.
CPC ............... *F16L 37/56* (2013.01); *F16L 3/015* (2013.01); *F16L 37/12* (2013.01)

(58) Field of Classification Search
CPC . F16L 37/56; F16L 37/12; F16L 37/20; F16L 37/18; F16L 37/114; F16L 37/407;
(Continued)

(56) References Cited

U.S. PATENT DOCUMENTS 1,173,997 A * 2/1916 Cobb ...................... F16L 37/56
285/26
1,198,705 A * 9/1916 Davis ...................... F16L 39/00
285/25
(Continued)

FOREIGN PATENT DOCUMENTS

DE        29 20 399         10/1980
DE        29 20 399 A1      10/1980
(Continued)

OTHER PUBLICATIONS

International Search Report (ISR) dated Jul. 7, 2017 in International (PCT) Application No. PCT/EP2017/000385.

*Primary Examiner* — Matthew Troutman
*Assistant Examiner* — James A Linford
(74) *Attorney, Agent, or Firm* — Collard & Roe, P.C.

(57) ABSTRACT

A coupling device for releasably connecting conduit portions comprises two connector block parts (2, 4) which can be coupled to one another, each having a plurality of receptacles (6) for matching connector parts that are to be connected to each other and that are arranged at the ends of the conduit portions, and is characterized in that at least one connector block part (2, 4) is associated with a guide device (32) that combines the conduit portions matching the respective connector parts (8) to a conduit bundle.

12 Claims, 4 Drawing Sheets

(58) Field of Classification Search
CPC . F16L 39/00; F16L 39/06; F16L 39/04; F16L 25/009; F16L 25/01; F16L 3/015
See application file for complete search history.

(56) References Cited

U.S. PATENT DOCUMENTS

| | | | | |
|---|---|---|---|---|
| 3,527,480 | A * | 9/1970 | Larson | F16L 37/56 285/85 |
| 3,767,234 | A * | 10/1973 | Weirich | F16L 37/56 285/123.2 |
| 4,288,107 | A * | 9/1981 | Schwartze | F16L 47/22 285/123.2 |
| 4,950,255 | A * | 8/1990 | Brown | A61M 39/10 439/372 |
| 2002/0005014 | A1 | 7/2002 | Doshita et al. | |
| 2002/0096879 | A1* | 7/2002 | Liao | F16L 37/56 285/124.1 |
| 2003/0184119 | A1 | 10/2003 | Doshita et al. | |
| 2017/0202128 | A1* | 7/2017 | Emmert | A01B 61/025 |

FOREIGN PATENT DOCUMENTS

| | | |
|---|---|---|
| DE | 689 07 273 | 1/1994 |
| DE | 689 07 273 T2 | 1/1994 |
| DE | 101 18 205 | 10/2001 |
| DE | 101 18 205 A1 | 10/2001 |
| DE | 10 2009 030 936 | 12/2010 |
| DE | 10 2009 030 936 A1 | 12/2010 |
| DE | 10 2014 002 376 | 4/2015 |
| DE | 10 2014 002 376 B3 | 4/2015 |
| EP | 0 349 344 B1 | 6/1993 |
| EP | 0 800 234 | 10/1997 |
| EP | 0 800 234 A1 | 10/1997 |
| FR | 2 333 189 | 6/1977 |
| FR | 2 333 189 A1 | 6/1977 |
| GB | 2 049 854 A | 12/1980 |
| WO | 2009/041862 | 4/2009 |

* cited by examiner

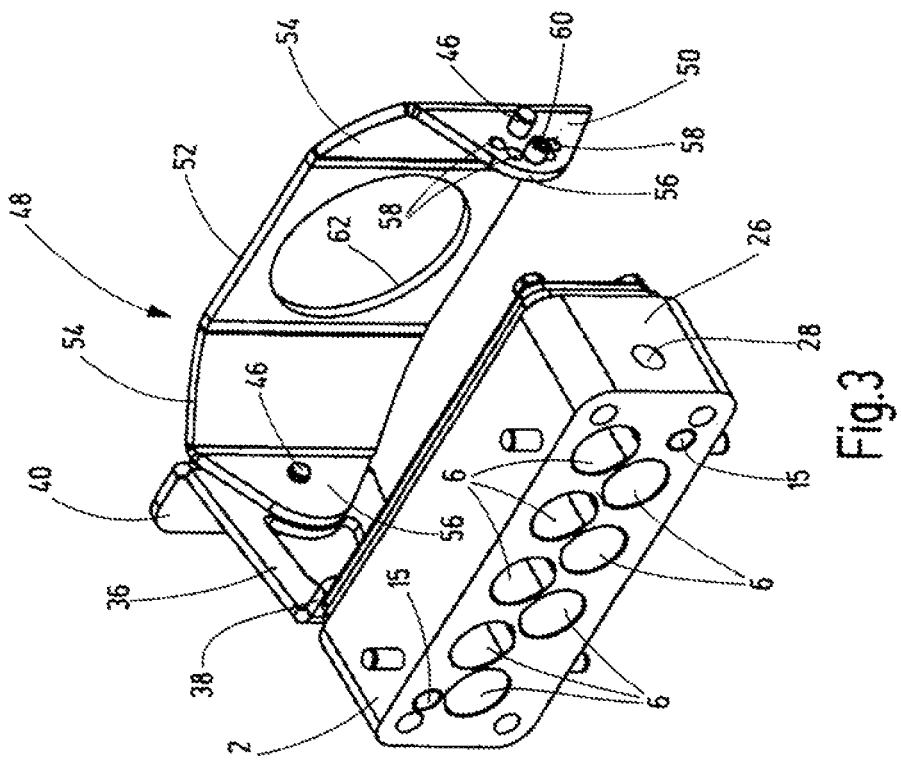
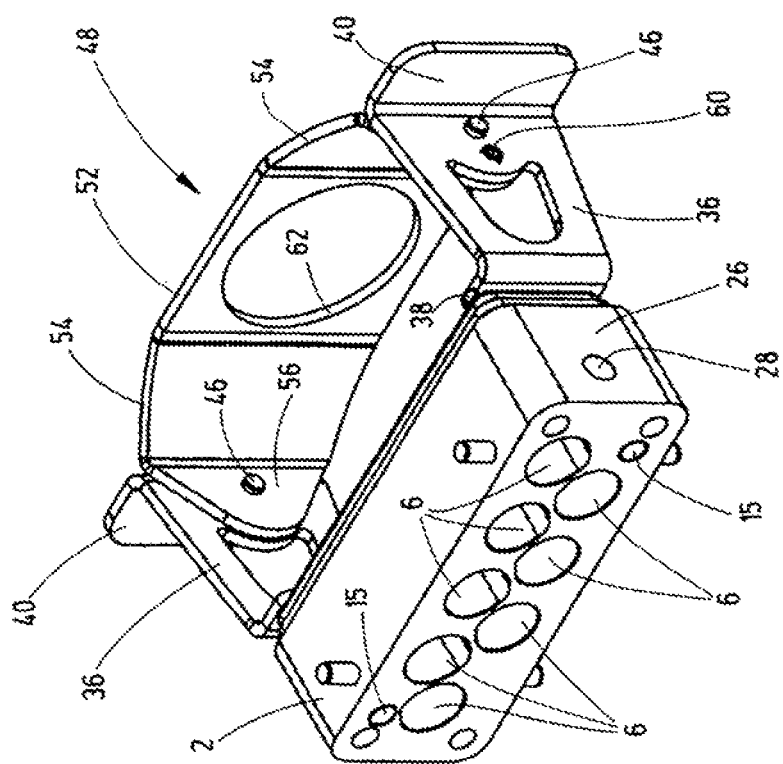

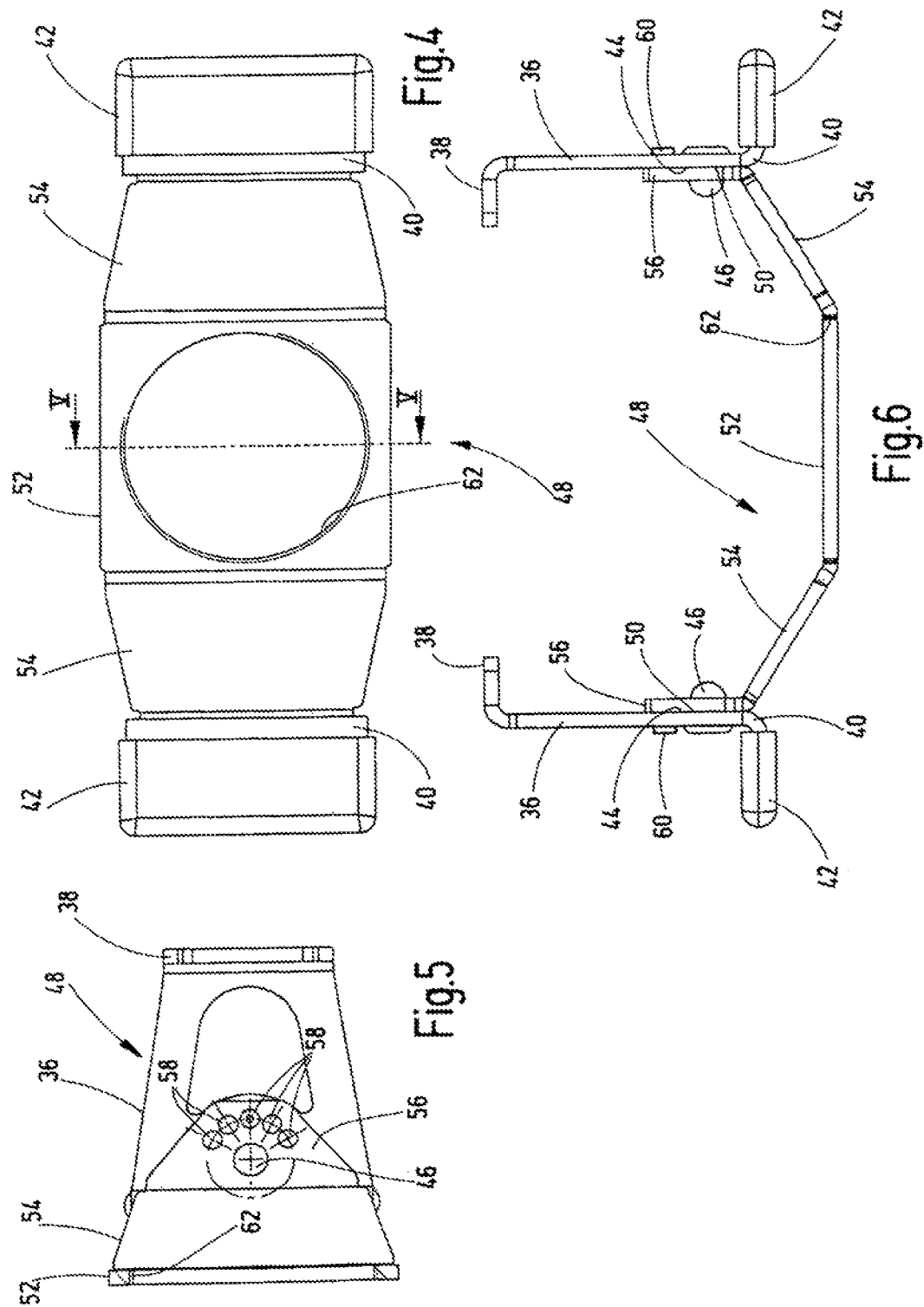

COUPLING DEVICE FOR RELEASABLY CONNECTING CONDUIT PORTIONS

The invention relates to a coupling device for releasably connecting conduit sections, having two connector block parts, which can be coupled to each other, which each have a plurality of receptacles for corresponding connector parts to be connected to one another, which connector parts are arranged at the ends of the conduit sections.

Coupling devices of this type are known in the prior art as multi-media or multiple couplings. DE 10 2009 030 936 A1 for instance shows a coupling device of this type. Such coupling devices may have a large number of receptacles for connector parts, such that a correspondingly large number of strands of the conduit sections extend from each other at intervals corresponding to the distances between the associated connector parts. The secure and orderly installation the correspondingly large number of single strands requires much time and effort resulting in cost, which has to be born by the user of the coupling devices.

With regard to this, the invention addresses the problem of providing a coupling device of the type mentioned, which is easy and inexpensive to use by the user.

According to the invention this problem is solved by a coupling device having the features of claim 1 in its entirety.

According to the characterizing part of claim 1, the invention provides a guide device at least one connector block part, which bundles the conduit sections associated to the respective connector parts into a conduit bundle. The effort required for the secure installation of a conduit bundle instead of a plurality of individual strands, both in terms of work time and costs, is reduced to a considerable extent, such that the coupling device according to the invention can be used particularly advantageously by the user.

With particular advantage, the arrangement can be made such that the guide device is adjustable in such a way that it specifies a course direction for the relevant bundle. Due to the option of adapting the course of the bundle to the conditions of the site of the coupling device, the process of installing the bundle is particularly simple.

In particularly advantageous embodiments, the guide device is arranged at a distance from the associated connector block part and is adjustable such that a course direction can be specified for the bundle, which differs from the course direction of the conduit sections between connector block part and guide device. In this way, a particularly favorable adaptation to the conditions of the site of the coupling device is rendered possible.

In a particularly advantageous manner, the guide device for bundling the conduit sections into a bundle may have a bundle exit part having an adjustable position.

The bundle exit part can be advantageously mounted in an adjustable manner on a bracket, which holds the exit part at a distance from the connector block part. As a result of the distance formed, abrupt changes in direction over a short distance of the individual strands of the conduit sections occur before its being bundled into the bundle in the exit section, such that the bundle is formed from the individual strands in a gentle manner.

In particularly advantageous embodiments, the exit part is swivel mounted on the holder by means of a bearing, which has a locking device, which can be used to specify the selected swivel angle for the exit part relative to the holder. The bearing can be advantageously designed such that the exit part can be swiveled over a total angle of 120°.

With particular advantage, the arrangement may be made such that the holder has two side walls extending at a distance from each other and parallel to each other away from the associated connector block part and each forming a bearing surface for supporting the exit part, against which an associated bearing surface of the exit part abuts, wherein the locking device is operative between these bearing surfaces. By choosing the length of the side walls between their junction on the connector block part and the bearing for the exit part, the distance between the connector block part and exit part can be set to a desired length. The side walls can be formed as a bent part from sheet steel, which forms the bearing surface for the swivel bearing of the exit part on a flat side, which exit part can be secured by means of the locking device on the bearing surface of the side walls in the selected swivel position.

In advantageous exemplary embodiments, the locking device has a series of positioning holes concentric to the swivel axis on one bearing surface, wherein a seat for a locking element is provided on the other bearing surface, which can be brought into locking engagement with a selected positioning hole. A screw that can be inserted in a threaded hole of the individual bearing surface can be provided as a locking element. For a total swivel angle of 120°, starting from a central positioning hole, two further drilled holes can be provided at angular intervals of 30° on either side of the central drilled hole.

With particular advantage, a strain relief for the bundle forming device may be provided at the bundle exit part. This can be formed by a commercially available screw joint provided on the exit part.

Advantageously laterally projecting handle parts for handling by a user may be attached to the side walls of the holder of the exit part. The operation of the coupling device, in particular the operation of coupling and uncoupling devices, is thus easy and convenient for the user.

Below the invention is explained in detail with reference to an exemplary embodiment shown in the drawings.

In the drawings:

FIG. 2 shows a perspective oblique view, in which in the separate representation only a connector block part with an attached, incompletely depicted conduit guide device is shown FIG. 3 shows a representation corresponding to FIG. 2, wherein part of the holder of the guide device has been omitted;

FIG. 4 shows a front view of the guide device;

FIG. 5 shows a longitudinal section of the guide device according to the section line V-V of FIG. 4;

FIG. 6 shows a plan view of the guide means; and

Figure 1:
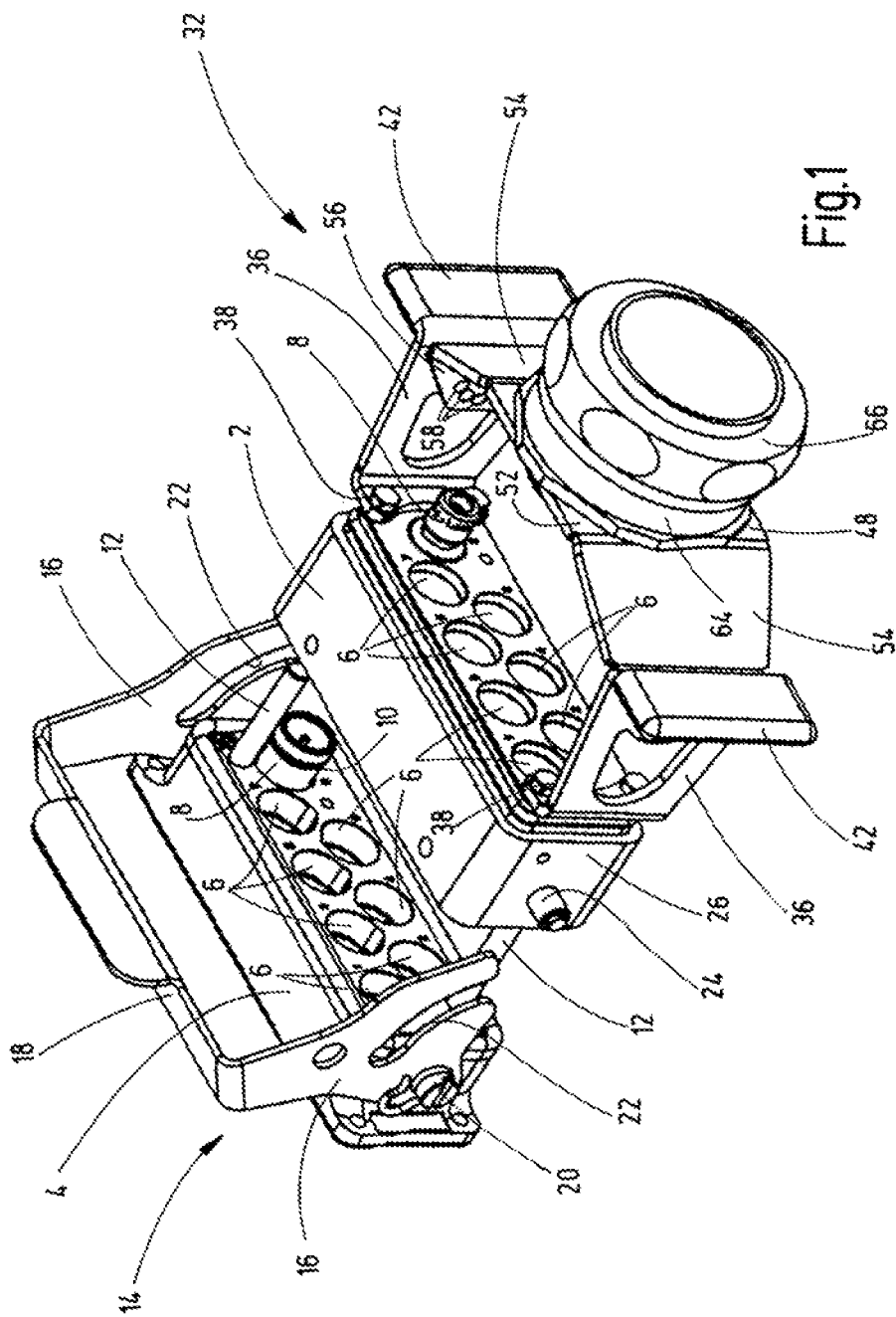
FIG. 1 shows a perspective oblique view of an exemplary embodiment of the coupling device according to the invention, wherein the connector block parts of the device are shown in extended state.

With reference to the accompanying drawings, the invention is illustrated using a coupling device of the type indicated in the aforementioned DE 10 2009 030 936 A1 by way of example. In contrast to the aforementioned, known coupling device connector, block parts 2 and 4 are provided in the present invention, which are not formed as round bodies, but in a kind of box construction as a block having a rectangular outline. Corresponding to the cited prior art, each of the connector block parts 2 and 4 has a number of receptacles 6 for connector parts 8. In the representation of FIG. 1, only one receptacle of each of the receptacles 6 in every connector block part 2 and 4 is equipped with a connector part 8, which are connector parts of electrical conduit sections, which are not shown. The receptacles 6 having the connector parts 8 are arranged in alignment with one another in the connector block parts 2 and 4, such that during coupling, when connector block parts 2 and 4 are moved from the position shown in FIG. 1 towards each other and contact each other, the connector parts 8 for the conduit connection engage with each other, wherein the connection is sealed in the usual manner by a sealing means 10, which is shown in FIG. 1 at the connector part 8 held in the connector block part 4. As a guide when moving the connector block parts 2 and 4 towards each other, a guide rod 12 is attached to each connector block part 4 in the region of its two narrow sides, which guide rods are guided in guide holes 15 in the connector block part 2, cf. FIGS. 2 and 3. In these figures, the connector block part 2 is shown in the unequipped state, that is, without connector parts 8 having been inserted into the receptacles 6. For a convenient implementation of coupling operations, the coupling device according to the invention comprises an actuating device 14. It has, as shown in FIG. 1, a bent part made of sheet steel, which has a cross member 18 running between two side parts 16, which cross member forms a handle for the user of the device. The identically shaped side parts 16 are swivel mounted on the narrow sides of the connector block part 4 by means of a screw 20 forming a swivel pin. Each side part 16 has a slot 22 opening outward, which is curved such that it forms a guidance gate for a guide pin 24, one of which sits on each narrow side 26 of the connector block part 2 in a pin hole 28 and projects outwardly. For the coupling operation, the guide pins 24 are brought into engagement with the gate formed by the slot 22 of the side parts 16. In the selected shape of the course of the gate formed by the slot 22 on the side members 16, a swivel movement results in a force component acting on the guide pin 24, which causes a relative movement of the connector block parts 2 and 4 for the convenient implementation of coupling operations.

The coupling device according to the invention has, at least in conjunction with one of the two connector block parts 2 and 4, a conduit guide device 32, which, in the exemplary embodiment shown, is connected to the connector block part 2 and is completely shown in FIG. 1, while in the remaining figures partial representations of the guide device 32 are shown. The guide device 32 can also be provided on the other connector block part 4, or guide devices can be provided on both connector block parts 2 and 4. As a main part, the guide device 32 has an exit part 34, which is arranged on a holder such that its position can be adjusted. It has two identically formed side walls 36 in the form of identically formed bent parts made of sheet steel. The side walls 36 are screwed onto the associated connector block part 2 using an angled foot part 38 such that the side walls 36 form an extension of the surface of the narrow sides 26 of the connector block part 2. At the front end facing away from the foot part 38, the side walls 36 have outwardly angled ears 40, which, as FIG. 1 shows most clearly, are each provided with a rubber coating, to form handles 42. Near the angled ears 40, the side walls 36 form a bearing surface 44 on the flat inside, cf. FIG. 6, on which bearing surface a swivel bearing pin 46 forms a swivel bearing for a conduit exit part 48, one bearing surface 50 of which rests against the bearing surface 44 of the side walls 36. The exit part 48, like the side walls 36, is also formed by a bent part of sheet steel and has a flat central portion 52 and slightly angled outer parts 54 laterally adjoining the former, to which in turn slightly bent side parts 56 are attached, which run in a plane perpendicular to the central part 52 and the outer surface of which forms the bearing surface 50 for the swivel bearing on the side walls 36.

Figure 7:
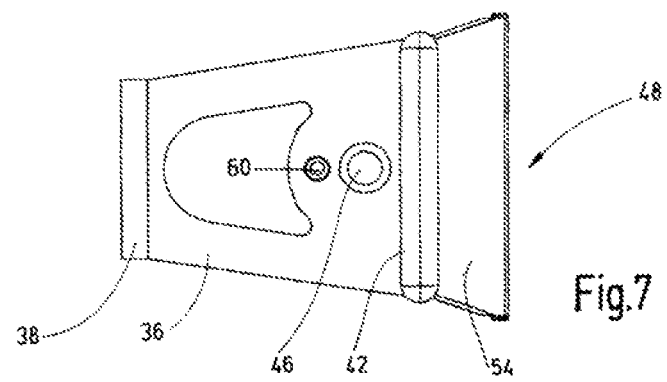
FIGS. 7 to 9 show side views of the guide device, wherein different swivel angle of the bundle exit part are shown.
Figure 8:
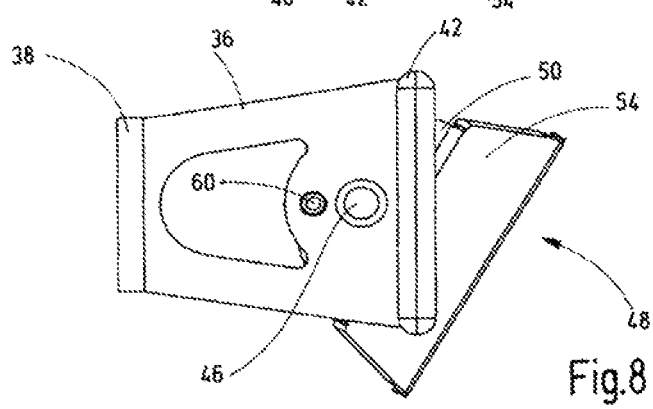
Figure 9:
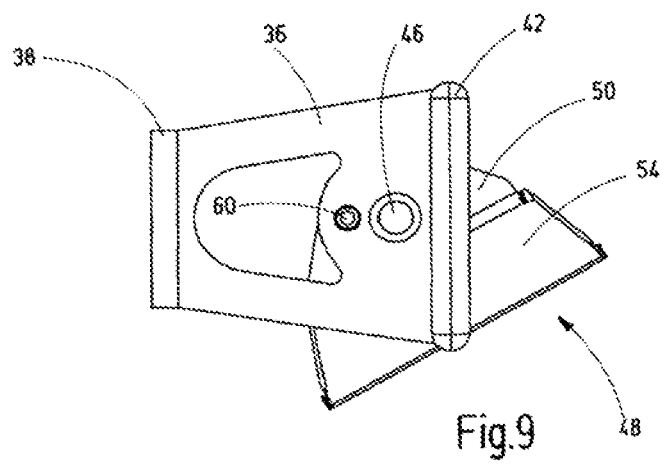

The swivel bearing of the exit part 48 formed with the bearing pin 46 on the bearing surfaces 44 and 50 on the holder formed by the side walls 36 can be set in desired swivel positions. For this purpose, in the exemplary embodiment shown, a series of positioning holes 58 is formed in the bearing surface 50 of the side parts 56, cf. in particular FIG. 5, which positioning holes are concentric to the swivel axis formed by the bearing pin 46. Starting from a central positioning hole, two further drilled holes 58 are formed at angular intervals of 30° in each case on both sides of the central drilled hole 58, such that these positioning holes 58 define a total swivel angle of 120°. FIGS. 7 to 9 show, starting from a central position (FIG. 7), swivel positions of 30° or 60° with respect to the center position for the exit part 48 in FIGS. 8 and 9. The bearing surface 44 of the side walls 36 has a threaded drilled hole for a locking element in the form of a screw 60 which comes into locking engagement with a selected drilled hole 58 for a form-fit securing in the swivel positions.

The exit part 48 held at a selected distance from the associated connector block part 2 corresponding to the length of the cheeks 36 has a central through-hole 62 for bundling the single strands of the conduit sections (not shown) starting at the connector block part 2, in which central through-hole the inserted conduit sections are combined to form the conduit bundle. As shown in FIG. 1, a strain relief is provided for the conduit bundle guided through the exit part 48, which strain relief is formed by commercially available screw joint 64 inserted into the through hole 62, which screw joint can be manually operated by means of a threaded ring 66. It will be appreciated that the guide device 32 shown in the present example in conjunction with the connector block part 2 could equally well be provided on the other connector block part 4 or in conjunction with both connector block parts 2 and 4. While in the example shown a connector part 8 to establish an electrical connection is shown in each connector block part 2 and 4, connector parts for flowable media, such as compressed air, can be provided, or a combination of connector parts 8 for electrical conduit sections and for flowable media can be provided.

The invention claimed is:

1. A coupling device for releasably connecting conduit sections, comprising a first connector block part and a second connector block part which are configured to be coupled to each other and which each have a plurality of receptacles for the connector block parts to be connected to one another and which are arranged at the ends of the conduit sections, wherein at least the first connector block part is dedicated to a guide device, which bundles the conduit sections associated with the first connector block part to form a conduit bundle, wherein the guide device comprises a first side wall and a second side wall that are screwed onto the first connector block part using an angled foot part such that the first side wall forms an extension of a first surface of a first narrow side of a rectangular body of the first connector block part and the second side wall forms an extension of a second surface of a second narrow side of the rectangular body of the first connector block part, wherein the guide device comprises an exit part which has a flat central portion, a first side part and a second side part, wherein the first side part and the second side part are positioned perpendicular to the flat central portion such that the exit part has a u-shaped design, wherein the outer surface of the exit part forms a bearing surface which is coupled to a swivel bearing arranged on the first side wall and the second side wall, and wherein the exit part has a central through-hole arranged in the flat central portion for bundling single strands of the conduit sections.

2. The coupling device according to claim 1, wherein the guide device is adjustable in such a way that it specifies a course direction for a respective conduit bundle.

3. The coupling device according to claim 1, wherein the guide device is arranged at a distance from the first connector block part and is adjustable such that a course direction can be specified for the conduit bundle, which differs from a course direction of the conduit sections between the first connector block part and the guide device.

4. The coupling device according to claim 1, wherein the guide device for bundling the conduit sections to form the conduit bundle has a bundle exit part having an adjustable position.

5. The coupling device according to claim 4, wherein the bundle exit part is adjustably mounted on a holder, which holds the bundle exit part at a distance from the first connector block part.

6. The coupling device according to claim 5, wherein the bundle exit part is swivel mounted at the holder via a swivel bearing, which has a locking device, which is configured to specify a selected swivel angle of the bundle exit part relative to the holder.

7. The coupling device according to claim 6, wherein the holder comprises two side walls extending at a distance from each other and parallel to each other away from the first connector block part and each side wall of the two side walls forms a bearing surface for the swivel bearing of the bundle exit part, against which an associated bearing surface of the bundle exit part rests, and such that the locking device is effective between the bearing surface formed by each side wall of the two side walls and the associated bearing surface of the bundle exit part.

8. The coupling device according to claim 7, wherein the locking device on the associated bearing surface of the bundle exit part has a series of positioning holes concentric to a swivel axis and a seat for a locking element is provided on the bearing surface formed by each side wall of the two side walls, which seat is configured to be brought into locking engagement with a selected positioning hole of the series of positioning holes.

9. The coupling device according to claim 7, wherein laterally projecting handle parts for handling by a user are mounted on the two side walls of the holder of the bundle exit part.

10. The coupling device according to claim 4, wherein a strain relief for a bundle forming device is provided at the bundle exit part.

11. A coupling device for releasably connecting conduit sections, comprising a first connector block part and a second connector block part which are configured to be coupled to each other and which each have a plurality of receptacles for the connector block parts to be connected to one another and which are arranged at the ends of the conduit sections, wherein at least the first connector block part is dedicated to a guide device, which bundles the conduit sections associated with the first connector block part to form a conduit bundle, wherein the guide device comprises a first side wall and a second side wall that are coupled to the first connector block part, wherein the guide device comprises an exit part which has a flat central portion, a first side part and a second side part, wherein the first side part and the second side part are positioned perpendicular to the flat central portion such that the exit part has a u-shaped design, wherein the exit part is coupled to the first side wall and the second side wall in a swiveling manner, wherein the exit part has a central through-hole arranged in the flat central portion for bundling single strands of the conduit sections.

12. A coupling device for releasably connecting conduit sections, comprising a first connector block part and a second connector block part which are configured to be coupled to each other and which each have a plurality of receptacles for the connector block parts to be connected to one another and which are arranged at the ends of the conduit sections, wherein at least the first connector block part is dedicated to a guide device, which bundles the conduit sections associated with the first connector block part to form a conduit bundle, wherein the guide device for bundling the conduit sections to form the conduit bundle has a bundle exit part having an adjustable position, wherein the bundle exit part is adjustably mounted on a holder, which holds the exit part at a distance from the first connector block part, wherein the bundle exit part is swivel mounted at the holder via a swivel bearing, which has a locking device, which can be used to specify a selected swivel angle of the bundle exit part relative to the holder, wherein the holder comprises two side walls extending at a distance from each other and parallel to each other away from the first connector block part and wherein each side wall of the two side walls forms a first bearing surface for the swivel bearing of the bundle exit part, against which an associated second bearing surface of the bundle exit part rests, such that the locking device is effective between the first bearing surface and the second bearing surface surfaces, wherein the locking device on the second bearing surface has a series of positioning holes being arranged on a hole circle which is concentric to a swivel axis, wherein a seat for a locking element is provided on the first bearing surface, and wherein the locking element is configured to be brought into locking engagement with a selected one of the positioning holes.

* * * * *